United States Patent
Satish et al.

(10) Patent No.: US 8,997,228 B1
(45) Date of Patent: Mar. 31, 2015

(54) TECHNIQUES FOR DETECTING INFECTED WEBSITES

(75) Inventors: Sourabh Satish, Fremont, CA (US); Nishant A. Doshi, Mountain View, CA (US)

(73) Assignee: Symantec Corporation, Mountain View, CA (US)

(*) Notice: Subject to any disclaimer, the term of this patent is extended or adjusted under 35 U.S.C. 154(b) by 69 days.

(21) Appl. No.: 13/605,448

(22) Filed: Sep. 6, 2012

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |

(52) U.S. Cl.
CPC .................................... *G06F 21/56* (2013.01)
USPC .............................................. 726/23; 726/24

(58) Field of Classification Search
CPC ..... G06F 21/56; G06F 21/562; G06F 21/564; G06F 21/566; H04L 63/14; H04L 63/1408; H04L 63/1416
See application file for complete search history.

(56) References Cited

U.S. PATENT DOCUMENTS

| 8,364,811 | B1 * | 1/2013 | Erdmann et al. | 709/224 |
| 8,370,938 | B1 * | 2/2013 | Daswani et al. | 726/23 |
| 2006/0253578 | A1 * | 11/2006 | Dixon et al. | 709/225 |
| 2008/0196085 | A1 * | 8/2008 | Nagoya et al. | 726/3 |
| 2011/0191849 | A1 * | 8/2011 | Jayaraman et al. | 726/23 |

OTHER PUBLICATIONS

Dre Armeda, "Conditional Redirect Malware", Mar. 2012, http://blog.sucuri.net/2012/03/conditional-redirect-malware-decoded-evalbase64_decode-example.html.*

* cited by examiner

*Primary Examiner* — Andrew Nalven
*Assistant Examiner* — Quy Pham
(74) *Attorney, Agent, or Firm* — Wilmer Cutler Pickering Hale and Dorr LLP

(57) ABSTRACT

Techniques for detecting infected websites are disclosed. In one particular embodiment, the techniques may be realized as a method for detecting an infected website comprising receiving at least one redirection report from at least one security agent, receiving at least one malware report from the at least one security agent, analyzing correlation between the at least one redirection report and the at least one malware report, aggregating information from the at least one redirection report, the at least one malware report, and the correlation analysis, and detecting an infected website based on the aggregated information.

19 Claims, 4 Drawing Sheets

TECHNIQUES FOR DETECTING INFECTED WEBSITES

FIELD OF THE DISCLOSURE

The present disclosure relates generally to websites that may be or become infected and, more particularly, to techniques for detecting infected websites.

BACKGROUND OF THE DISCLOSURE

Websites are susceptible to infection. Malicious hackers may use exploit kits or other techniques to infect websites. The infection may occur by changing a web server's configuration files or content. Some infections manifest themselves to users by redirecting the users to malicious websites. A redirection may be in the form of an HTTP response status code "302 Found" with the URL to which the user should be redirected.

For example, a user may attempt to navigate to a website such as http://www.acme-insecurity.com. In some cases, the infected website might redirect the user to an obviously malicious website such as http://www.malware-makers.com. The malicious website may display unwanted advertising, pornography, violence, or otherwise offensive content. The malicious website may attempt to transfer a virus or other malware to a redirected user. Additionally, redirections may eventually cause degrading machine hygiene as measured by rate or history of infections.

In other cases, the infected website might redirect the user to a more subtle malicious website such as http://www.ac-me_insecurity.com. In this example, the malicious website is located at an address that uses an underscore instead of the hyphen in the legitimate website address, which a redirected user might not notice. The malicious website may attempt to mimic the legitimate website to trick a redirected user into revealing sensitive or otherwise private information through a phishing or other social engineering attack. For example, the malicious website might attempt to steal a user's password by mimicking or spoofing the legitimate website so that a redirected user may attempt to login before realizing that the malicious website is fake.

Increasingly, websites are infected in such a way that users will be redirected only when certain conditions are satisfied. In some cases, an infected website may contain malicious code that redirects users to a malicious website only if the users arrived at the infected website by way of a particular search engine or social networking website. For example, if a user navigates to http://www.search-engine.com, searches for "Acme Insecurity," and clicks a link in the search results for http://www.acme-insecurity.com, then the malicious code will detect that the referring website was Search-Engine.com. This referrer may satisfy the condition in the malicious code that triggers a redirect to the malicious website. In contrast, if the user navigates to http://www.acme-insecurity.com directly, then it may not satisfy any of the conditions to trigger a redirect. This user may continue browsing http://www.acme-insecurity.com as if the legitimate website was not infected at all.

Conventional website infection detection techniques may fail to take conditional redirection into account, making it difficult or even impossible for conventional techniques to reproduce, verify, or collect information about a website infection. Additionally, conventional techniques may also be more likely to detect false positives because they fail to determine when a redirect may be intentional by the legitimate website and not a result of an infection.

In view of the foregoing, it may be understood that there may be significant problems and shortcomings associated with current website infection detection technologies.

SUMMARY OF THE DISCLOSURE

Techniques for detecting infected websites are disclosed. In one particular embodiment, the techniques may be realized as a method for detecting an infected website comprising receiving at least one redirection report from at least one security agent, receiving at least one malware report from the at least one security agent, analyzing correlation between the at least one redirection report and the at least one malware report, aggregating information from the at least one redirection report, the at least one malware report, and the correlation analysis, and detecting an infected website based on the aggregated information.

In accordance with further aspects of this particular embodiment, the method may comprise sending redirection protection information for the infected website based on the aggregated information to the at least one security agent.

In accordance with additional aspects of this particular embodiment, the method may comprise determining at least one condition for redirection based on the aggregated information, wherein the redirection protection information comprises condition information based on the at least one condition.

In accordance with additional aspects of this particular embodiment, the method may comprise receiving at least one protected URL registration for at least one URL, sending protected URL information to the at least one security agent based on the at least one protected URL registration, and sending an infected website notification to contact information based on the at least one protected URL registration.

In accordance with additional aspects of this particular embodiment, the method may comprise wherein analyzing correlation further comprises comparing a redirection time based on the at least one redirection report to a malware detection time based on the at least one malware report.

In accordance with additional aspects of this particular embodiment, the method may comprise wherein detecting an infected website further comprises determining that a difference between the malware detection time and the redirection time is less than a threshold period of time.

In accordance with additional aspects of this particular embodiment, the method may comprise wherein the correlation analysis comprises a low correlation between the at least one redirection report and the at least one malware report, and wherein the infected website is detected regardless of the low correlation.

In accordance with additional aspects of this particular embodiment, the method may comprise wherein the infected website comprises an infected advertisement from an advertising network independent from the infected website.

In another particular exemplary embodiment, the techniques may be realized as a system for detecting an infected website comprising one or more processors communicatively coupled to a network, wherein the one or more processors are configured to receive at least one redirection report from at least one security agent, receive at least one malware report from the at least one security agent, analyze correlation between the at least one redirection report and the at least one malware report, aggregate information from the at least one redirection report, the at least one malware report and the correlation analysis, and detect an infected website based on the aggregated information.

In accordance with additional aspects of this particular embodiment, the one or more processors may be further configured to send redirection protection information for the infected website based on the aggregated information to the at least one security agent.

In accordance with additional aspects of this particular embodiment, the one or more processors may be further configured to determine at least one condition for redirection based on the aggregated information, wherein the redirection protection information comprises condition information based on the at least one condition.

In accordance with additional aspects of this particular embodiment, the one or more processors may be further configured to receive at least one protected URL registration for at least one URL, send protected URL information to the at least one security agent based on the at least one protected URL registration, and send an infected website notification to contact information based on the at least one protected URL registration.

In accordance with additional aspects of this particular embodiment, wherein analyze correlation further comprises comparing a redirection time based on the at least one redirection report to a malware detection time based on the at least one malware report.

In accordance with additional aspects of this particular embodiment, wherein detect an infected website further comprises determining that a difference between the malware detection time and the redirection time is less than a threshold period of time.

In yet another particular exemplary embodiment, the techniques may be realized as an article of manufacture for detecting an infected website, the article of manufacture comprising at least one non-transitory processor readable storage medium, and instructions stored on the at least one medium, wherein the instructions are configured to be readable from the at least one medium by at least one processor and thereby cause the at least one processor to operate so as to receive at least one redirection report from at least one security agent, receive at least one malware report from the at least one security agent, analyze correlation between the at least one redirection report and the at least one malware report, aggregate information from the at least one redirection report, the at least one malware report and the correlation analysis, and detect an infected website based on the aggregated information.

In accordance with additional aspects of this particular embodiment, the instructions may cause the at least one processor to operate further so as to send redirection protection information for the infected website based on the aggregated information to the at least one security agent.

In accordance with additional aspects of this particular embodiment, the instructions may cause the at least one processor to operate further so as to determine at least one condition for redirection based on the aggregated information, wherein the redirection protection information comprises condition information based on the at least one condition.

In accordance with additional aspects of this particular embodiment, the instructions may cause the at least one processor to operate further so as to receive at least one protected URL registration for at least one URL, send protected URL information to the at least one security agent based on the at least one protected URL registration, and send an infected website notification to contact information based on the at least one protected URL registration.

In accordance with additional aspects of this particular embodiment, wherein analyze correlation further comprises comparing a redirection time based on the at least one redirection report to a malware detection time based on the at least one malware report.

In accordance with additional aspects of this particular embodiment, wherein detect an infected website further comprises determining that a difference between the malware detection time and the redirection time is less than a threshold period of time.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
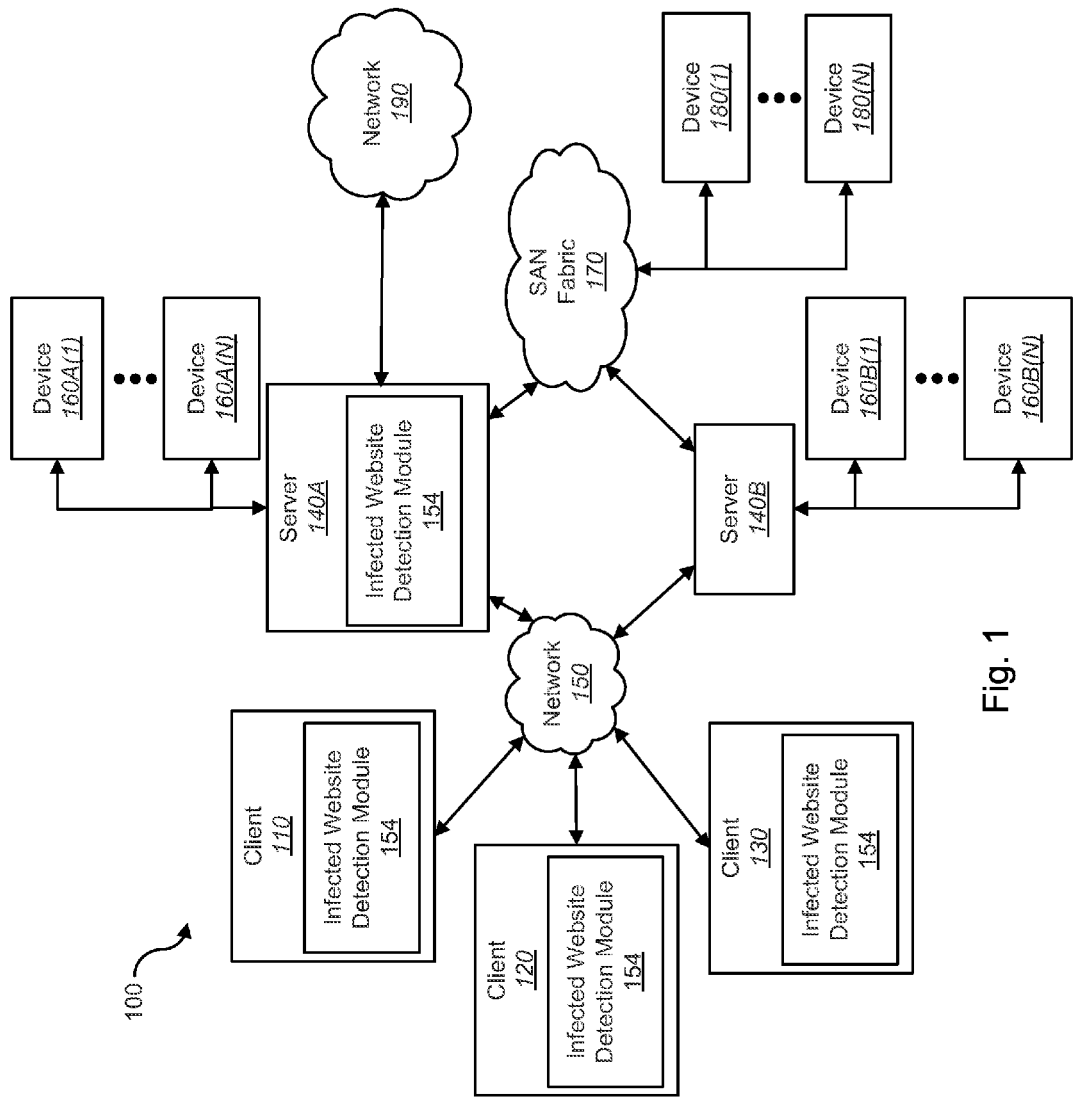
FIG. 1 shows a block diagram depicting a network architecture for infected website detection in accordance with an embodiment of the present disclosure.

FIG. 1 shows a block diagram depicting a network architecture 100 for infected website detection in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., infected website detection module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
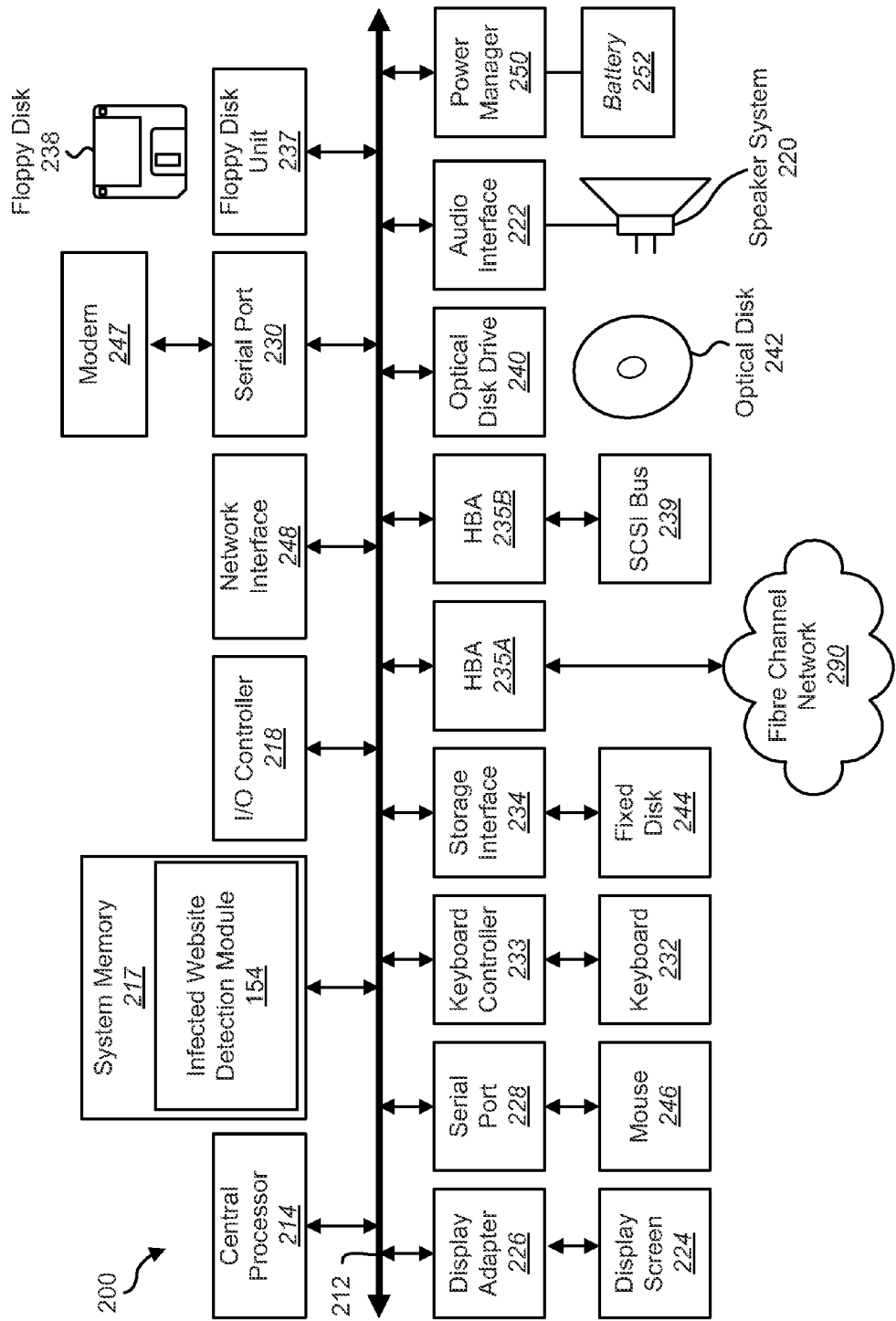
FIG. 2 depicts a block diagram of a computer system for infected website detection in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for infected website detection such as, for example, infected website detection module 154. As illustrated, one or more portions of infected website detection module 154 may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, infected website detection module 154 may be implemented as part of a cloud computing environment.

FIG. 2 depicts a block diagram of a computer system 200 for infected website detection in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, infected website detection module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
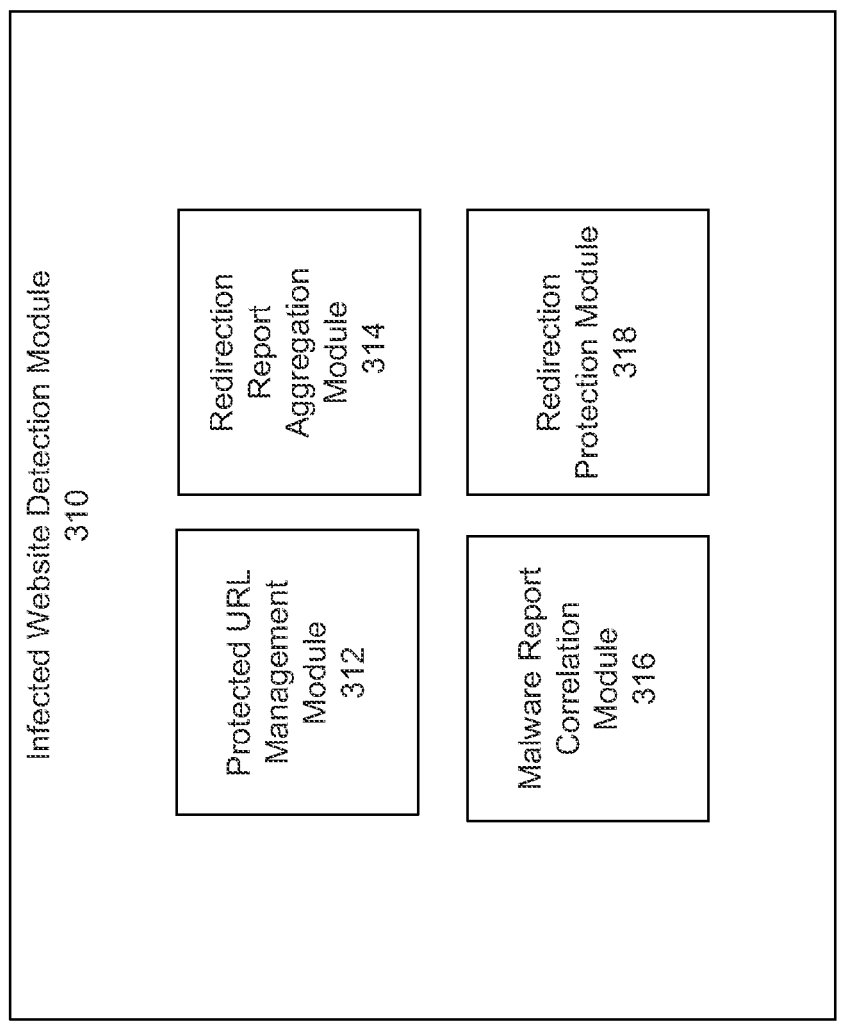
FIG. 3 shows an infected website detection module in accordance with an embodiment of the present disclosure.

Referring to FIG. 3, there is shown a infected website detection module 310 in accordance with an embodiment of the present disclosure. As illustrated, the infected website detection module 310 may contain one or more components including protected URL management module 312, redirection report aggregation module 314, malware report correlation module 316, and redirection protection module 318.

The description below describes network elements, computers, and/or components of a system and method for infected website detection that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

According to some embodiments, protected URL management module 312 may manage a list of protected URLs. For example, a security vendor may provide a service to register a website as a protected URL. The protected URL management module 312 may process and track registrations of websites as protected URLs within the security vendor's service. In some embodiments, the infected website detection module 310 will enable detecting infections for websites registered with the protected URL management module 312. In some embodiments, the protected URL management module 312 may maintain contact information for administrators of registered websites to enhance the infection notification services. For example, if an infection is detected in a registered website, the protected URL management module 312 may notify or alert an administrator about the possible infection. The notification may include details about the type, circumstances, severity, or other information about the infection. Additionally, the protected URL management module 312 may allow for a website administrator to designate certain redirections from certain URLs as intentional or safe.

In some embodiments, the protected URL management module 312 may provide information regarding protected URLs to users. For example, a user may be using a security agent from the security vendor. The security agent may be a network security engine such as an intrusion protection system (IPS) engine that can detect or monitor redirects from a protected URL to any other website based on the protected URL information sent by the protected URL management module 312.

According to some embodiments, the redirection report aggregation module 314 may aggregate redirection reports submitted by a plurality of security agents detecting redirects for the user. In some embodiments, the redirection report aggregation module 314 may be in communication with the protected URL management module to determine whether a particular redirection report is analyzed, or whether a particular redirection report contains an intentional and safe redirection. In some embodiments, the redirection report aggregation module 314 may prioritize when a particular redirection report is analyzed based on whether the redirection report contains a redirection from a protected URL.

In some embodiments, the redirection report aggregation module 314 may analyze a redirection report to assess the conditions in which the redirection may have occurred. For example, the redirection report may include a set of site navigation parameters, including HTTP parameters such as the Referrer or the User Agent. The redirection report aggregation module 314 may also analyze conditions across a plurality of redirection reports, such as the time elapsed between subsequent redirection reports. In some embodiments, the redirection report aggregation module 314 may aggregate data across a plurality of redirection reports, analyzing intersections of redirections details from a plurality of redirected users to detect whether a website is infected and determine the conditions that may have been satisfied to trigger the redirection more accurately.

According to some embodiments, the malware report correlation module 316 may be in communication with the redirection report aggregation module 314 to correlate malware reports received from a plurality of users with the redirection reports received from the plurality of users. For example, the user's security agent may also scan for malware on the user's system. A scan may occur periodically, or a scan may be triggered when the security agent detects a redirect. In some embodiments, the malware report correlation module 316 may receive reports from the security agent when malware is first detected on the user's system. A malware report may include information about the circumstances in which the security agent detected the malware. For example, the malware report may include the date and time at which the malware was first detected in the user's system.

In some embodiments, the malware report correlation module 316 may correlate malware reports from users with infections of particular malware to redirection reports from those users redirected from a particular website. The correlation may enable the redirection report aggregation module 314 to detect infected websites more accurately. For example, if users redirected from a particular website are also infected with a particular malware, it may be more likely that the malware infection resulted from a malicious redirection due to a website infection.

In some embodiments, the malware report correlation module 316 may use the date and time information in a malware report to improve the correlation of malware infections with redirections. For example, if a redirection report indicates that a user's security agent detected a redirection at a first time, and the security agent subsequently detected new malware on the system within a predetermined threshold period of time following the redirection, it may be more likely still that the new malware infection resulted from a malicious redirection due to a website infection. For example, the threshold may be one minute, ten minutes, or any length of time suitable to improve the accuracy of correlating malware report information with redirection report information.

According to some embodiments, the redirection protection module 318 may be in communication with the redirection report aggregation module 314 to facilitate protecting users from malicious redirections due to infected websites. For example, the redirection protection module 318 may send information regarding possible infection to users' security agents, which the security agents may use to protect the users from malicious redirection, such as by blocking access to infected websites or redirected users to safe landing websites instead of malicious websites.

In some embodiments, the redirection protection module 318 may include information regarding the conditions that must be satisfied to trigger a malicious redirection for a particular infected website to enable more selective protection. For example, the redirection protection module 318 may report that a particular infected website only causes a malicious redirection when a user the referring website is a particular search engine. With this information, a security agent may selectively permit access to the infected website when the known conditions for triggering a malicious redirection are not satisfied.

Additionally, in SafeWeb, URLs may be marked with security information. In some embodiments, SafeWeb URLs with specific redirect parameters on a given target URL may be marked as a security risk, while URLs without those redirect parameters may be marked as safe.

In some embodiments, the infected website detection module 310 may detect redirections due to malicious advertisements published to advertisement networks. Advertisement networks that fail to prevent malicious advertisement placement may be rated poorly in an advertisement network rating system. In some embodiments, the redirection protection module 318 may send information about an advertising network's rating to the security agents. The security agents may vary the degree of protection when a user encounters an advertising or other content publishing network based on an implied risk associated with a particular rating.

Figure 4:
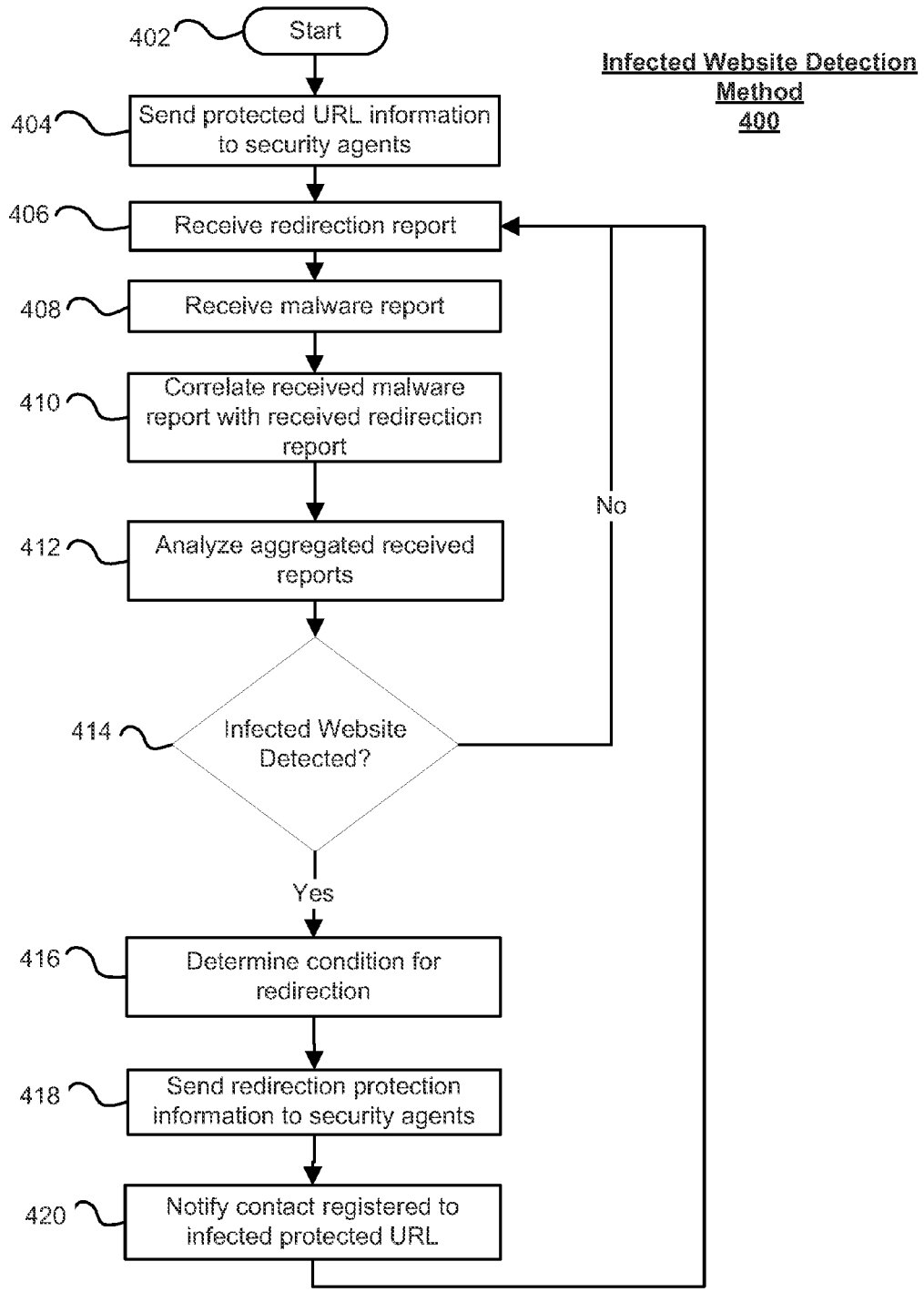
FIG. 4 depicts a method for detecting an infected website in accordance with an embodiment of the present disclosure.

Referring to FIG. 4, there is depicted a method 400 for detecting an infected website in accordance with an embodiment of the present disclosure. At block 402, the method 400 may begin.

At block 404, protected URL information may be sent to security agents for a plurality of users.

At block 406, one or more redirection reports from one or more security agents may be received.

At block 408, one or more malware reports from one or more security agents may be received.

At block 410, the one or more received malware reports may be correlated with the one or more security agents. In some embodiments, correlation may be based on the type of malware reported or the amount of time elapsed between detecting the redirection and detection the malware.

At block 412, information from the one or more received reports may be aggregated, and the aggregated received reports may be analyzed to detect whether a particular website is infected.

At decision block 414, if an infected website was not detected at block 412, then the method 400 may return to block 406 so additional reports may be received for aggregation and analysis. If an infected website was detected at block 412, then the method 400 may proceed to block 416.

At block 416, after an infected website has been detected, one or more conditions that must be satisfied to trigger a malicious redirection may be determined based on the analysis at block 412.

At block 418, redirection protection information may be sent to the security agents. If a condition was determined at block 416, the determined condition may be included as part of the redirection protection information sent to the security agents.

At block 420, if the infected website is a registered protected URL, the contact registered to the infected protected URL may be notified. In some embodiments, if the infected website is not a registered protected URL, an appropriate point of contact may be determined and notified if possible.

After the contact is notified, then the method 400 may return to block 406 so additional reports may be received for aggregation and analysis so that further detection of additional infected websites may proceed.

At this point it should be noted that infected website detection in accordance with the present disclosure as described above may involve the processing of input data and the generation of output data to some extent. This input data processing and output data generation may be implemented in hardware or software. For example, specific electronic components may be employed in a infected website detection module or similar or related circuitry for implementing the functions associated with infected website detection in accordance with the present disclosure as described above. Alternatively, one or more processors operating in accordance with instructions may implement the functions associated with infected website detection in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for detecting an infected website comprising:
  receiving, by at least one hardware computer processor, a plurality of redirection reports from a plurality of security agents, wherein each redirection report comprises information about a redirection from a first website to a malicious website and information about a plurality of website navigation parameters associated with a request for the first website;
  determining a first value of a website navigation parameter of the plurality of website navigation parameters that at least partially satisfies a condition of a conditional redirection from the first website to the malicious website based on the plurality of redirection reports;

determining that the first website is infected with malicious code that causes the conditional redirection based on the plurality of redirection reports, wherein the malicious code causes the conditional redirection from the first website to the malicious website when at least one condition of the conditional redirection is satisfied; and selectively permitting access to the first website infected with the malicious code that causes the conditional redirection when the at least one condition of the conditional redirection is not satisfied.

2. The method of claim 1, further comprising sending redirection protection information about the infected first website to at least one security agent of the plurality of security agents based on the plurality of redirection reports.

3. The method of claim 1, further comprising:
receiving at least one protected URL registration for at least one URL;
sending protected URL information to at least one security agent of the plurality of security agents based on the at least one protected URL registration; and
sending an infected website notification based on the at least one protected URL registration.

4. The method of claim 1, further comprising:
receiving at least one malware report from at least one security agent of the plurality of security agents; and
comparing a redirection time based on at least one redirection report from the at least one security agent to a malware detection time based on the at least one malware report.

5. The method of claim 4, wherein determining that the first website is infected with malicious code further comprises determining that a difference between the malware detection time and the redirection time is less than a threshold period of time.

6. The method of claim 1, wherein the infected first website comprises an infected advertisement from an advertising network independent from the infected first website.

7. A system for detecting an infected website comprising:
at least one processor configured to:
receive a plurality of redirection reports from a plurality of security agents, wherein each redirection report comprises information about a redirection from a first website to a malicious website and information about a plurality of website navigation parameters associated with a request for the first website;
determine a first value of a website navigation parameter of the plurality of website navigation parameters that at least partially satisfies a condition of a conditional redirection from the first website to the malicious website based on the plurality of redirection reports;
determine that the first website is infected with malicious code that causes the conditional redirection based on the plurality of redirection reports, wherein the malicious code causes the conditional redirection from the first website to the malicious website when at least one condition of the conditional redirection is satisfied; and
selectively permit access to the first website infected with the malicious code that causes the conditional redirection when the at least one condition of the conditional redirection is not satisfied; and
at least one memory, coupled to the at least one processor, configured to provide the at least one processor with instructions.

8. The system of claim 7, wherein the at least one processor is further configured to send redirection protection information about the infected first website to at least one security agent of the plurality of security agents based on the plurality of redirection reports.

9. The system of claim 7, wherein the at least one processor is further configured to:
receive at least one protected URL registration for at least one URL;
send protected URL information to at least one security agent of the plurality of security agents based on the at least one protected URL registration; and
send an infected website notification based on the at least one protected URL registration.

10. The system of claim 7, wherein the at least one processor is further configured to:
receive at least one malware report from at least one security agent of the plurality of security agents; and
comparing a redirection time based on at least one redirection report from the at least one security agent to a malware detection time based on the at least one malware report.

11. The system of claim 10, wherein determine that the first website is infected with malicious code further comprises determining that a difference between the malware detection time and the redirection time is less than a threshold period of time.

12. An article of manufacture for detecting an infected website, the article of manufacture comprising:
at least one non-transitory processor readable storage medium; and
instructions stored on the at least one medium;
wherein the instructions are configured to be readable from the at least one medium by at least one processor and thereby cause the at least one processor to operate so as to:
receive a plurality of redirection reports from a plurality of security agents, wherein each redirection report comprises information about a redirection from a first website to a malicious website and information about a plurality of website navigation parameters associated with a request for the first website;
determine a first value of a website navigation parameter of the plurality of website navigation parameters that at least partially satisfies a condition of a conditional redirection from the first website to the malicious website based on the plurality of redirection reports;
determine that the first website is infected with malicious code that causes the conditional redirection based on the plurality of redirection reports, wherein the malicious code causes the conditional redirection from the first website to the malicious website when at least one condition of the conditional redirection is satisfied; and
selectively permitting access to the first website infected with the malicious code that causes the conditional redirection when the at least one condition of the conditional redirection is not satisfied.

13. The article of manufacture of claim 12, wherein the instructions cause the at least one processor to operate further so as to send redirection protection information about the infected first website to at least one security agent of the plurality of security agents based on the plurality of redirection reports.

14. The article of manufacture of claim 12, wherein the instructions cause the at least one processor to operate further so as to:

receive at least one protected URL registration for at least one URL;

send protected URL information to at least one security agent of the plurality of security agents based on the at least one protected URL registration; and send an infected website notification based on the at least one protected URL registration.

15. The article of manufacture of claim 14, wherein the instructions cause the at least one processor to operate further so as to:

receive at least one malware report from at least one security agent of the plurality of security agents; and comparing a redirection time based on at least one redirection report from the at least one security agent to a malware detection time based on the at least one malware report.

16. The article of manufacture of claim 12, wherein determine that the first website is infected with malicious code further comprises determining that a difference between the malware detection time and the redirection time is less than a threshold period of time.

17. The method of claim 1, further comprising determining a second value of the website navigation parameter of the plurality of website navigation parameters that fails the condition of the conditional redirection.

18. The method of claim 17, wherein the first value is a first referring web address, and wherein the second value is a second referring web address.

19. The method of claim 17, wherein the first value is a first time of redirection, and wherein the second value is a second time of redirection.

* * * * *